M. J. SLOAN.
TRAP.
APPLICATION FILED MAR. 17, 1917.
1,237,399.
Patented Aug. 21, 1917.
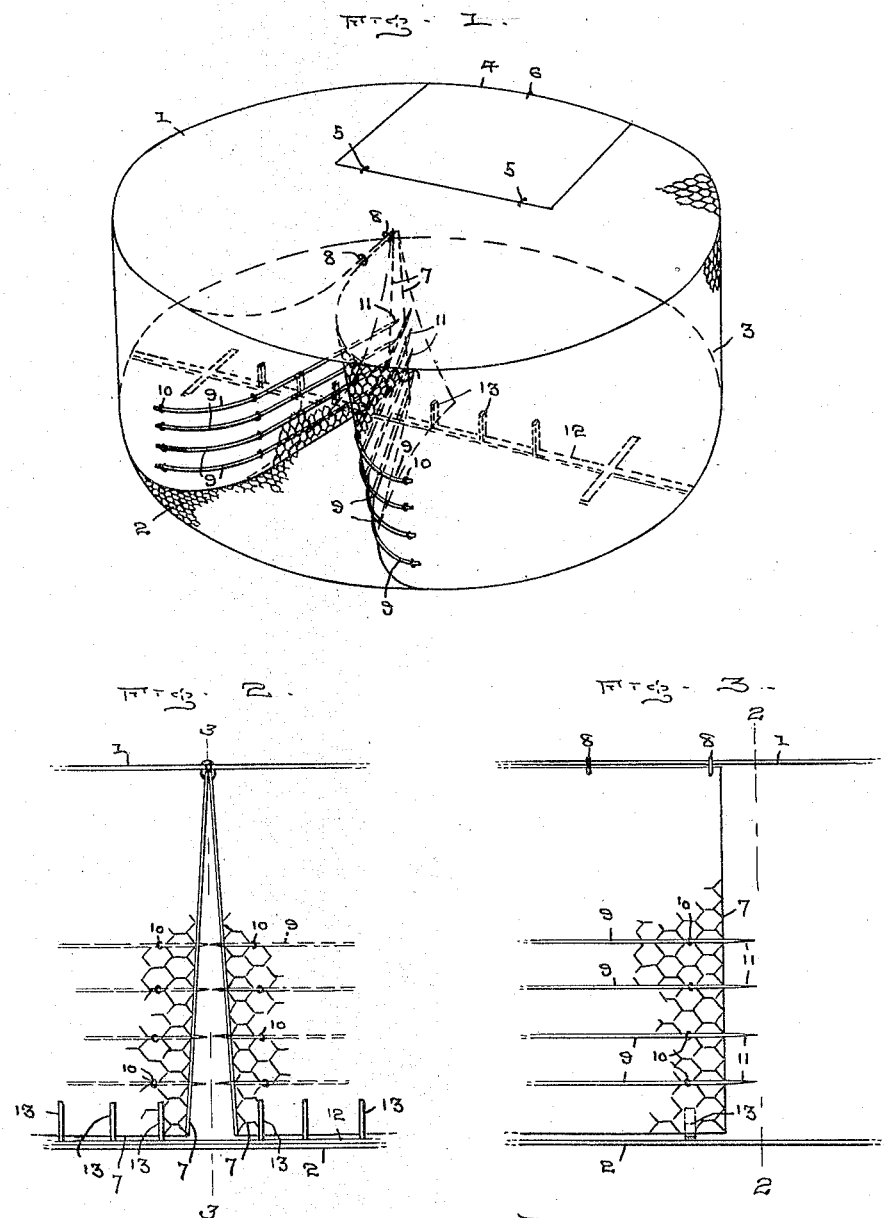
Inventor
Matthew J. Sloan
By
W. J. FitzGerald & Co.
Attorneys

UNITED STATES PATENT OFFICE.

MATTHEW J. SLOAN, OF ARCH CREEK, FLORIDA.

TRAP.

1,237,399. Specification of Letters Patent. Patented Aug. 21, 1917.

Application filed March 17, 1917. Serial No. 155,398.

*To all whom it may concern:*

Be it known that I, MATTHEW J. SLOAN, a citizen of the United States, residing at Arch Creek, in the county of Dade and State of Florida, have invented certain new and useful Improvements in Traps; and I do hereby declare the following to be a full, clear, and exact description of the invention, such as will enable others skilled in the art to which it appertains to make and use the same.

This invention relates to traps and the principal object of the invention is to provide a trap which will be equally effective in catching either birds, fowls or animals.

A further object of the invention is to provide a trap wherein the side walls are converged inwardly and provided with prongs at their inner edges, suitable tensioning means being provided whereby when the victim has once entered the trap, the inwardly converging portions of the side walls will be urged together to substantially close the entrance to the trap, the prongs preventing egress of the victim.

A still further object of the invention is to provide means for varying the size of the entrance opening and further providing means for limiting the opening and closing movements of the lower portions of the wings in each adjusted portion.

With these and other objects in view as will appear as the description proceeds, the invention comprises the various novel features of construction, combination and arrangement of parts as will be more fully described hereinafter and set forth with particularity in the appended claims.

Referring to the drawings:

Figure 1 is a perspective view of my novel construction of trap.

Fig. 2 is a vertical sectional view taken on the line 2—2 of Fig. 3, and

Fig. 3 is a vertical sectional view taken on the line 3—3 of Fig. 2.

Similar characters of reference are used to denote like parts throughout the following description and the accompanying drawings.

Referring more particularly to the drawings, it will be seen that I have in this instance shown the trap to be of circular formation, but I desire to have it understood that the trap may be of any desired shape or design found desirable and best suited for the purpose intended.

The reference numerals 1 and 2 represent the top and bottom of the trap respectively, while the numeral 3 indicates the vertical side walls of the trap, the top being provided with a door 4 that is hingedly connected to the top as at 5 and is designed to be secured by a suitable catch 6.

The side walls 3 are converged inwardly to provide a pair of wings 7 that are securely attached together at their upper edges and to the top 1 by suitable fastening means 8. The inner upright edges of the wings 7 diverge downwardly from the top to the bottom so as to provide an entrance opening for the victim.

In order that the wings may be held substantially closed, I provide resilient reinforcing stays 9 that are arranged longitudinally of the wings and have their outer ends flexed around into engagement with the side walls 3, these outer terminal ends being securely attached to the side walls by suitable fastening means 10, while the inner ends of the stays are sharpened as indicated by the numeral 11. By flexing the outer ends of the stay wires around into engagement with the side walls of the trap, a sufficient amount of tension is placed upon the wings so as to urge them together the full limit of their movement. By this construction it will be apparent that a small bird, fowl or animal may enter the trap between the wings 7, the wings being forced apart sufficiently to permit of his entrance, while the resilient stay wires serve to immediately bring the wings together or toward each other, while the sharpened ends 11 will prevent any attempted egress of the victim.

Mounted upon and securely attached to the bottom 2 is a bar or wire rod 12, which is provided intermediate its end with a plurality of spaced upright arms 13 between which are designed to be positioned the lower free edges of the wings. As shown the wings are positioned between the central pair of upright arms 13, and should the entrance opening be desired to be slightly increased so as to permit of the entrance of a larger size victim, the lower edges of the wings are lifted up and placed over between the next outer pair of arms. Each pair of arms is spaced apart just sufficiently to permit of the wings having an opening and closing movement of such range as will permit of the entrance of the desired size victim.

While I have shown the trap constructed of wire mesh, it is to be understood that it may be made of any other material found desirable and suited for the purpose.

What I claim is:—

1. A trap comprising a top, bottom and side walls, said side walls being converged inwardly to provide a pair of wings, means for securing the upper edges of said wings together and to the top, the inner upright edges of said wings diverging downwardly, and means for exerting an inward tension on the lower free portions of said wings.

2. A trap comprising a top, bottom and side walls, said side walls being converged inwardly to provide a pair of wings, means for securing the upper edges of said wings together and to the top, the inner upright edges of said wings diverging downwardly, means for exerting an inward tension on the lower free portions of said wings, means for limiting the opening and closing movements of said wings.

3. A trap comprising a top, bottom and side walls, said side walls being converged inwardly to provide a pair of wings, means for securing the upper edges of said wings together and to the top, resilient means for urging said wings together, and means for varying the size of the entrance opening between said wings.

4. A trap comprising a top, bottom and side walls, said side walls being converged inwardly to provide a pair of wings, means for securing the upper edges of said wings together and to the top, resilient stay wires attached to and arranged longitudinally of each wing, the outer free ends of said wires being flexed around into engagement with the side walls, means for attaching the outer free ends to said side walls, and means for varying the size of the entrance opening between said wings.

5. A trap comprising a top, bottom and side walls, said side walls being converged inwardly to provide a pair of wings, means for securing the upper edges of said wings together and to the top, tensioned stay wires carried by each wing and attached to the side walls, the inner free ends of said wires being sharpened, and means for varying the entrance opening between said wings.

In testimony whereof I have signed my name to this specification in the presence of two subscribing witnesses.

MATTHEW J. SLOAN.

Witnesses:
 E. R. BRION,
 A. SLONE.

Copies of this patent may be obtained for five cents each, by addressing the "Commissioner of Patents, Washington, D. C."